(12) United States Patent
Shen et al.

(10) Patent No.: US 7,441,202 B2
(45) Date of Patent: Oct. 21, 2008

(54) SPATIAL MULTIPLEXING TO MEDIATE DIRECT-TOUCH INPUT ON LARGE DISPLAYS

(75) Inventors: Chia Shen, Lexington, MA (US);
Katherine Everitt, Seattle, WA (US);
Kathleen Ryall, Cambridge, MA (US);
Clifton L. Forlines, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 500 days.

(21) Appl. No.: 11/057,356

(22) Filed: Feb. 14, 2005

(65) Prior Publication Data

US 2006/0181518 A1    Aug. 17, 2006

(51) Int. Cl.
G06F 3/048 (2006.01)
G06F 3/033 (2006.01)
G06F 3/041 (2006.01)

(52) U.S. Cl. .................. 715/769; 715/863; 715/764; 345/173

(58) Field of Classification Search .................. 715/769, 715/863, 764; 345/173
See application file for complete search history.

(56) References Cited

U.S. PATENT DOCUMENTS

| | | | | |
|---|---|---|---|---|
| 5,422,993 A | * | 6/1995 | Fleming | 715/835 |
| 5,511,148 A | * | 4/1996 | Wellner | 358/1.6 |
| 5,892,509 A | * | 4/1999 | Jakobs et al. | 715/751 |
| 6,037,937 A | * | 3/2000 | Beaton et al. | 715/764 |
| 6,313,853 B1 | * | 11/2001 | Lamontagne et al. | 715/762 |
| 6,498,590 B1 | | 12/2002 | Dietz et al. | 343/893 |
| 6,741,235 B1 | * | 5/2004 | Goren | 345/173 |
| 2002/0152240 A1 | * | 10/2002 | Kitainik et al. | 707/517 |
| 2003/0020738 A1 | * | 1/2003 | Milburn et al. | 345/700 |
| 2004/0046784 A1 | * | 3/2004 | Shen et al. | 345/733 |

OTHER PUBLICATIONS

Bier, E. A., Stone, M., Pier, K., Buxton, W. & DeRose. T. Toolglass and magic lenses: the see-through interface. Proc. SIGGRAPH, ACM Press (1993), 73-80.
Dietz, P. and Leigh, D. DiamondTouch: A Multi-User Touch Technology. Proc. of UIST 2001, 219-226.
Scott, S.D., Carpendale, M.S.T, Inkpen, K.M., Territoriality in Collaborative Tabletop Workspaces. *Proc. CSCW 2004*, ACM Press (2004) 294-303.
Wu, M., & Balakrishnan, R., Multi-finger and whole hand gestural interaction techniques for multi-user tabletop displays. ACM UIST 2003, 193-20.

* cited by examiner

*Primary Examiner*—William L. Bashore
*Assistant Examiner*—Stephen Alvesteffer
(74) *Attorney, Agent, or Firm*—Dirk Brinkman; Clifton D. Mueller; Gene V. Vinokur

(57) ABSTRACT

A graphical user interface has a display surface that is segmented into multiple regions. A set of unique, non-overlapping locations is associated with each region. A set of actions that can be performed by the graphical user interface is defined. A document to be displayed on the display surface is selected. The document is moved to a particular location, and a particular action of the set of actions is performed on the selected object according to the particular location of the object on the display surface to operate the graphical user interface in one of a plurality of modes for the particular action.

9 Claims, 4 Drawing Sheets

100

SPATIAL MULTIPLEXING TO MEDIATE DIRECT-TOUCH INPUT ON LARGE DISPLAYS

FIELD OF THE INVENTION

This invention relates generally to graphical user interfaces, and more particularly to graphical user interfaces where objects are displayed on a surface, and operations on the objects are performed by pointing at the objects, or touching the objects directly or indirectly.

BACKGROUND OF THE INVENTION

The most common types of graphical user interfaces (GUI) are mouse interfaces and direct-touch interfaces. Objects displayed on such display surfaces of the graphical user interfaces are typically manipulated by a user according to an operation-object metaphor.

First, the user selects an operation P via a menu or other user interface means from some predefined set of possible actions. Second, the user selects an object O to which the operation is applied. Sometimes, the metaphor is an object-operation. That is, the object O is selected first, and then the operation P is applied. Crucially, the operation P that is applied to the object O is independent of the location L of the object on a display interface.

Actions A, such as a right mouse click, left mouse click or mouse drag, are used to select the operation, objects, and to apply the operations to the objects. The action applies the operation to the selected object.

Typically, a mode M for applying the operation is determined by the set of operations P(i) that are allowed given the selected object O(i) and previous operations P(i−1) that have already been selected and/or applied to the object. In this case, the operating mode M is determined by the last operation P(i−1) that was selected. The result of an action A for an object O is based on the object, the mode M, and the operation P. The result changes a current state O(i) of the object to a next state O(i+1), i.e., O(i+1)=O(i)+M+P(i). Prior art interfaces usually provide visual indication for the mode. Often the last operation, P(i−1), which sets the mode is either not visible or visible in the form of a toolbar shadow and possibly a cursor image.

FIG. 4 summarizes the operation of typical prior art graphical user interfaces. A set of actions 421 is defined 420. An object having a state (i) 401 is selected and displayed 430. A particular action is executed 440 to perform an operation, which changes the state of the object to (i+1)

For a mouse-based interface, the appearance of a pointer or cursor can indicate the current operating mode M(i). Thus, the pointer serves two roles to the user. The pointer indicates relative positional information (where the action will take place) and the operating mode (what the action will be). However, that scheme does not work well with direct-touch interfaces.

With a direct-touch surface there is no capability for indirect feedback, i.e., there is no way to move the pointer without touching or nearly touching the surface, which usually corresponds to an action. This is because on a direct-touch surface the finger is both the pointer and the input device. Thus, the pointer cannot indicate the position of the input means, e.g., a hand or stylus, when the input means is not in direct contact with the touch-sensitive surface. In other words, the input means will always occlude some portion of the display surface, specifically, the portion which is being operated on. This is another reason why the method of using the visual pointer is not a good choice for displaying the mode of operation for direct-touch interfaces.

Interaction on a display surface with hands provides a potential for gesture by changing finger position and position of both hands. A large display provides more capabilities for segmenting the space to assist use. For example, the PalmPilot segments its touch interface into separate regions for recognizing stylus marks as numbers or letters. This simple segmentation reduces input errors without requiring the user to learn a more complex, and hence, a larger distinguishable set of input drawings.

Therefore, it is desired to provide users of a direct-touch sensitive interface with a system in which the actions that can be applied to an object depend on where the object is located in the display, i.e., each such location is a mode region: the user moves an object to a special area of the window in order to make certain actions possible.

SUMMARY OF THE INVENTION

The invention provides a touch-sensitive user interface in which a set of actions A are used to apply a set of operations P to an object O depending on a location L of the object on a display surface.

A user moves an object O(i) to a location L(i) on the display surface in order to enable particular actions A(i). This mode of operation is general, and applicable to all types of graphical user interfaces, and especially useful for touch-sensitive display surface where the user performs operations with fingers and hands.

Therefore, according to the present invention, a current operating mode M(i) is determined and visually indicated according to a formulation:

$$M(i)=A(i)+O(i)+L(i).$$

The invention provides a touch-sensitive graphical user interface that can operate in multiple modes; each mode is dictated by the location L(i) where the object O is displayed. Each location L(i) can have a distinctive visual appearance, such as a specific textual background to indicate the mode M(i) of this location.

Objects are displayed on a touch-sensitive display surface. Actions can be single finger touches on this surface, or touches with multiple fingers. Touching can include movement of the finger(s) to generate gestures. The same action can result in a different mode depending on the location in which the action takes place.

DETAILED DESCRIPTION OF THE PREFERRED EMBODIMENT

Figure 1:
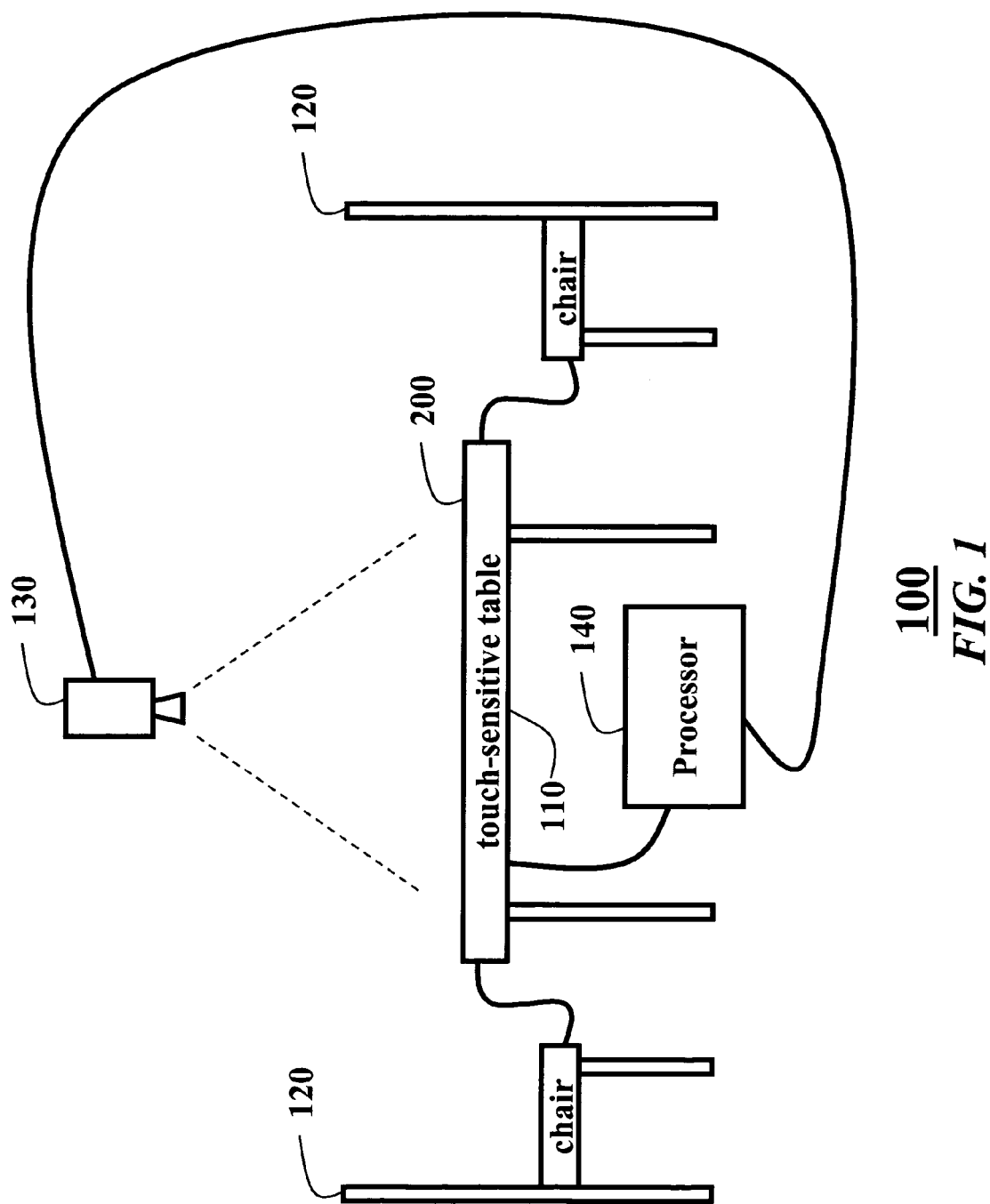
FIG. 1 is a side view of a graphical user interface according to the invention.

FIG. 1 shows a multi-model, touch-sensitive graphical user interface 100 according to our invention. The system includes a table 110 with a touch-sensitive surface 200, one or more chairs 120, a projector 130, and a processor 140. When a user sitting in one of the chairs 120 touches the surface 200 a capacitive coupling is induced. As a unique feature, multiple touches or gestures can be detected concurrently for a single user or multiple users.

Images are displayed on the surface 200 according to the touches. The images include selected objects O(i) to be manipulated, e.g., documents. It should be understood that the objects can also include photographs, videos, drawings, and so forth. Therefore, the objects can have different types T, and the operations and modes of working the invention can depend on the type of object.

We prefer to use a touch surface that is capable of recognizing simultaneously multiple points of touch from multiple users, see Dietz et al., "DiamondTouch: A multi-user touch technology," Proc. User Interface Software and Technology (UIST) 2001, pp. 219-226, 2001, and U.S. Pat. No. 6,498,590 "Multi-user touch surface," issued to Dietz et al., on Dec. 24, 2002, incorporated herein by reference. Hand gestures are described in U.S. patent application Ser. No. 10/659,180, "Hand Gesture Interaction with Touch Surface," filed by Wu et al., on Sep. 10, 2003, incorporated herein by reference.

Figure 2:
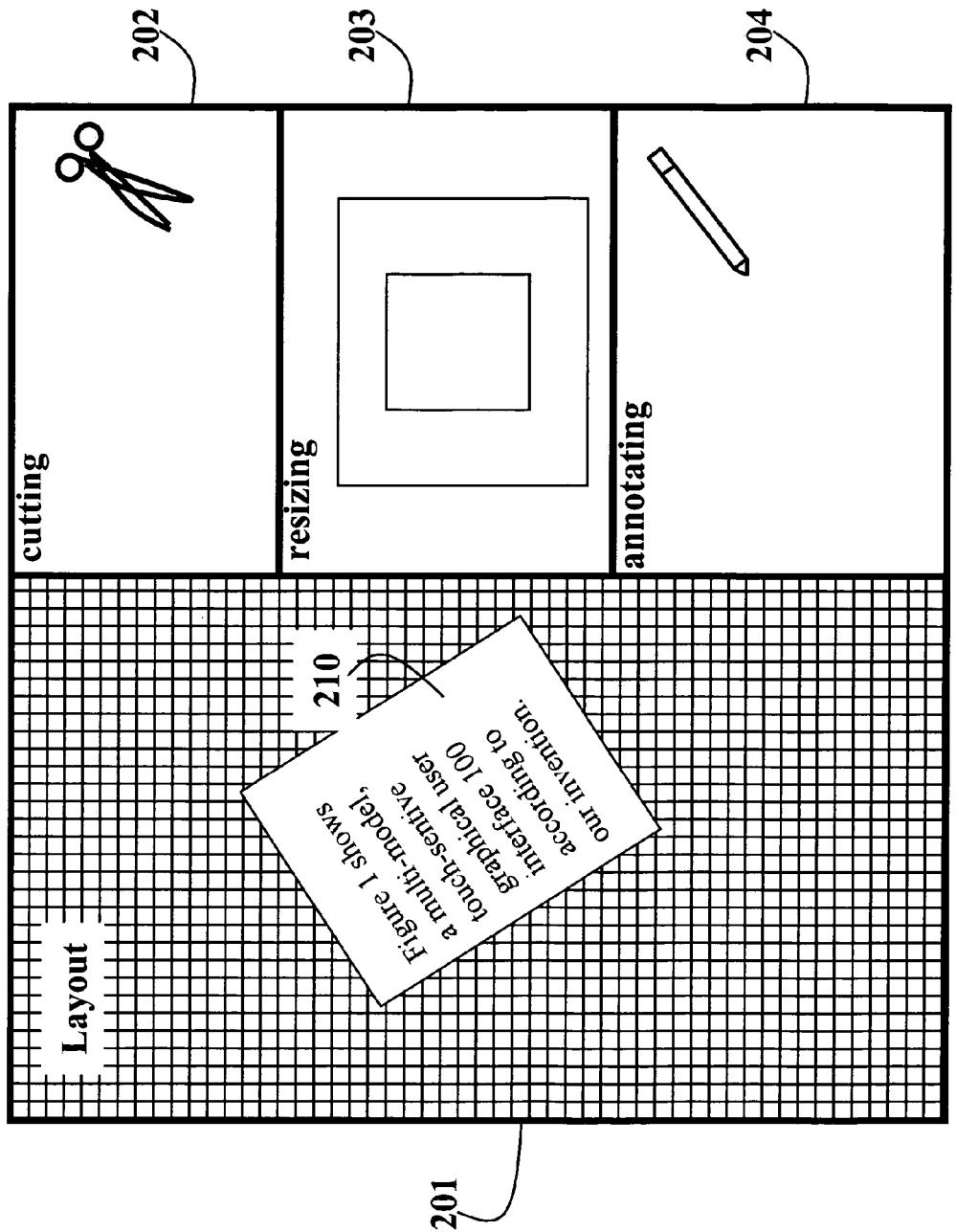
FIG. 2 is a top view of the interface according to the invention.

As shown in FIG. 2 for an example document editing application, the surface 200 is segmented into a set of regions 201-204, e.g., a layout region 201, a cutting region 202, a resizing region 203, and an annotating region 204. Each region defines a set of unique, non-overlapping locations L(i).

A set of actions A(i) is defined. The actions are in the form of touch gestures, for example, touching the display interface with one, two, or three fingers at a time. As a feature of the invention, the touch gestures can be interpreted as different modes M(i) of operating the interface, depending on which location L(i) is touched. Therefore, the number of possible modes of operating the interface is larger than the set of actions.

In the layout region 201, the user can move a displayed object 210, e.g. a selected document 210 by touching the document with one, two or three fingers. In the other regions, a two-finger touch moves a document.

When the document is moved into the cutting region 202, a one-finger touch 'cuts' the document along a horizontal straight line passing through location touched and extending to both vertical edges of the document. A three-finger touch cuts out a rectangular portion of the document. The distance of the two fingers corresponding to touch locations that are the farthest apart define the two opposing diagonal corners of the rectangle. The line and rectangle are two types of visual feedback.

When the document is moved into the resize region 203, a one-finger touch increases the size of the document, and a three-finger touch decreases the size.

When the document is moved into the annotation region 204, a one-finger touch is used to annotate on the touched document, and a three-finger touch erases the annotation.

Because there are only three different gestures or actions, the user can learn the gestures quickly, while having access to many more different operating modes: moving, cutting, sizing, annotating and erasing.

Figure 3:
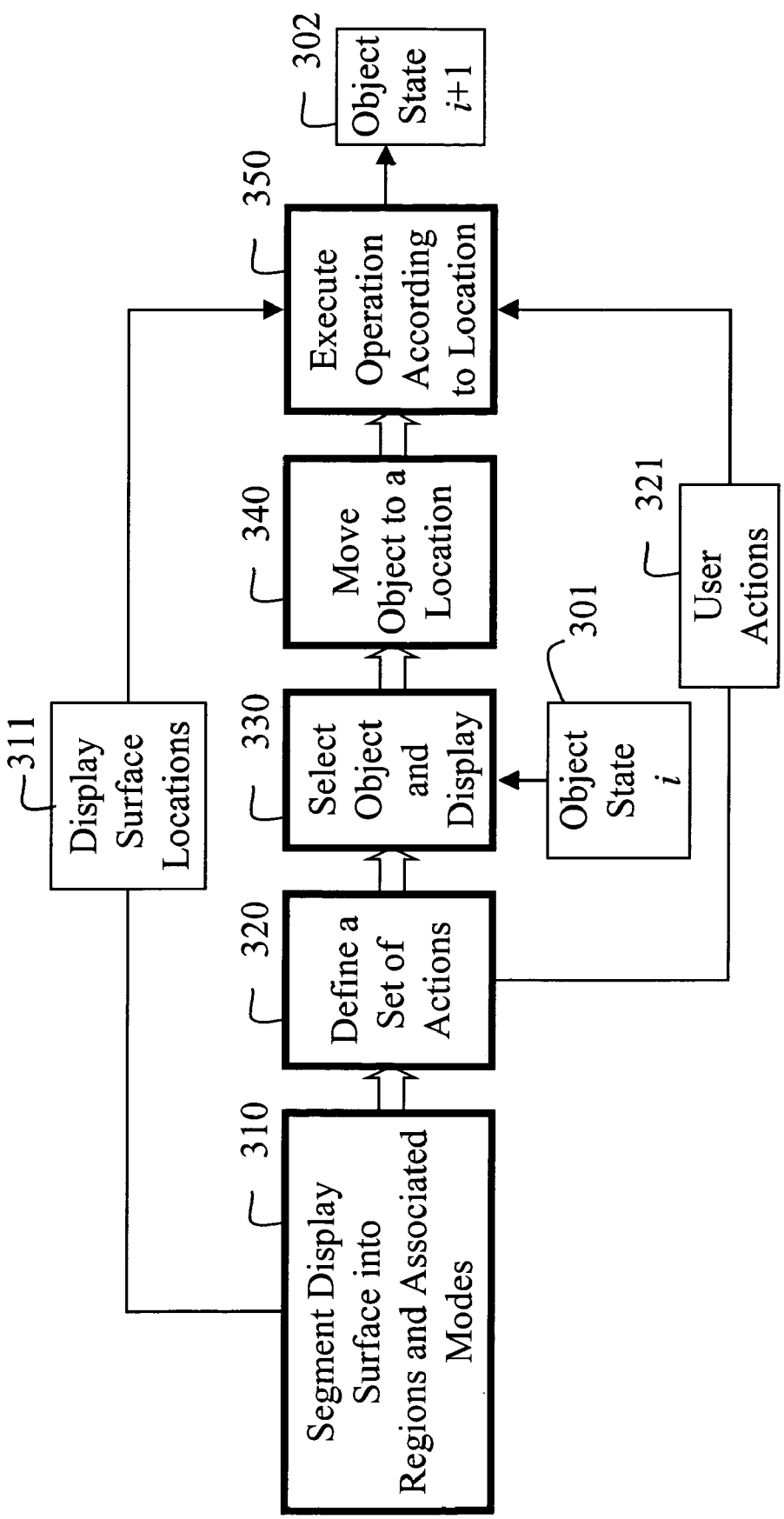
FIG. 3 is a flow diagram of a method for operating the interface of FIG. 2.
Figure 4:
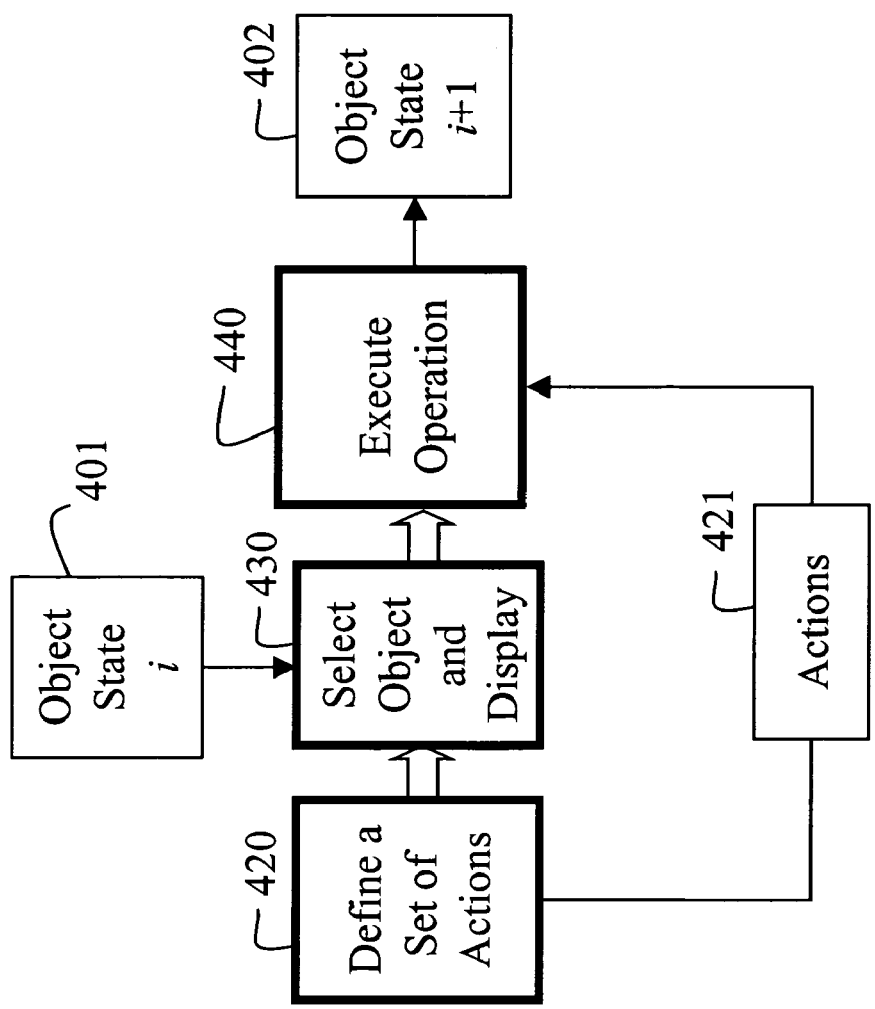
FIG. 4 is a flow diagram for operating a prior art user interface.

Thus, as shown in FIG. 3, a method 300 for operating the graphical user interface 100 includes the following steps. The display surface 200 of the graphical user interface is segmented 310 into multiple regions, and a set of unique, non-overlapping locations 311 is associated with each region. A set of actions 321 to be performed by the interface is defined 320. An object having a state (i) 301 is selected and displayed 330. The object is moved 340 to a particular location. Then, a particular action of the set of actions is performed 350 on the object according to the particular location of the object on the display surface. This changes the object to a next state (i+1) 302 to operate the graphical user interface in one of a plurality of modes for the particular action.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for operating a graphical user interface, comprising:
segmenting a display surface of the graphical user interface into a plurality of regions, in which the display surface is touch-sensitive, and associating a set of unique, non-overlapping locations with each region, such that the regions completely tile the display surface, and in which the display surface is segmented into a layout region, a cutting region, a resizing region, and an annotating region;
defining a set of actions that can be performed by the graphical user interface;
defining each action as a touch gesture, such that the same touch gestures are interpreted as different modes of operating the graphical user interface depending the locations touched;
selecting a document to be displayed on the display surface;
moving the document to a particular location; and
performing a particular action of the set of actions on the selected object according to the particular location of the object on the display surface to operate the graphical user interface in one of a plurality of modes for the particular action, and in which the object is a document moved to the cutting region, and in which the document is cut along a horizontal straight line passing through the location touched by one finger and extending to both vertical edges of the document.

2. The method of claim 1, further comprising:
sensing concurrently locations of multiple touches by multiple users, and to associate each touched location with a particular user.

3. The method of claim 1, further comprising:
projecting images on the display surface, the images including the selected object.

4. The method of claim 1, in which the multiple users are capacitively coupled to the display surface when touching the surface.

5. The method of claim 1, in which object is a document, and in which the document is moved in the layout regions by touching the document with one or more fingers.

6. The method of claim 1, in which the object is a document, and in which the document is moved in the cutting region, the resizing region, and the annotating region by touching the document with two fingers.

7. The method of claim 1, in which the object is a document moved to the cutting region, and in which a three-finger touch cuts out a rectangular of the document, a distance of two fingers corresponding to two locations that are farthest apart defining two opposing diagonal corners of the rectangle.

8. The method of claim 1, in which the object is a document moved to the resize region, and in which a one-finger touch increases a size of the document, and a three-finger touch decreases the size of the document.

9. The method of claim 1, in which the object is a document moved to the annotation region, and in which a one-finger touch annotates the document, and a three-finger touch erases the annotation.

* * * * *